(12) United States Patent
Liu et al.

(10) Patent No.: US 10,984,266 B2
(45) Date of Patent: Apr. 20, 2021

(54) VEHICLE LAMP DETECTION METHODS AND APPARATUSES, METHODS AND APPARATUSES FOR IMPLEMENTING INTELLIGENT DRIVING, MEDIA AND DEVICES

(71) Applicant: BEIJING SENSETIME TECHNOLOGY DEVELOPMENT CO., LTD., Beijing (CN)

(72) Inventors: Shinan Liu, Beijing (CN); Xingyu Zeng, Beijing (CN); Junjie Yan, Beijing (CN); Xiaogang Wang, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/588,126

(22) Filed: Sep. 30, 2019

(65) Prior Publication Data
US 2020/0026936 A1 Jan. 23, 2020

Related U.S. Application Data

(63) Continuation of application No. PCT/CN2019/079300, filed on Mar. 22, 2019.

(30) Foreign Application Priority Data

Mar. 30, 2018 (CN) .......................... 201810278351.7

(51) Int. Cl.
*G06K 9/00* (2006.01)
*B60W 50/14* (2020.01)
*G06N 3/08* (2006.01)
*G08G 1/16* (2006.01)

(52) U.S. Cl.
CPC ......... *G06K 9/00825* (2013.01); *B60W 50/14* (2013.01); *G06N 3/08* (2013.01); *G08G 1/162* (2013.01); *G08G 1/163* (2013.01)

(58) Field of Classification Search
None
See application file for complete search history.

(56) References Cited

U.S. PATENT DOCUMENTS

| 2015/0304539 A1 | 10/2015 | Kristensen et al. |
| 2015/0304593 A1 | 10/2015 | Sakai |
| 2017/0116488 A1* | 4/2017 | Patander .............. G06K 9/6269 |

(Continued)

FOREIGN PATENT DOCUMENTS

| CN | 103607554 A | 2/2014 |
| CN | 103927548 A | 7/2014 |

(Continued)

OTHER PUBLICATIONS

International Search Report in the international application No. PCT/CN2019/079300, dated Jun. 4, 2019.

(Continued)

*Primary Examiner* — James M Anderson, II
(74) *Attorney, Agent, or Firm* — Syncoda LLC; Feng Ma

(57) ABSTRACT

A vehicle lamp detection method includes: obtaining an image block including an image of a vehicle; and performing vehicle lamp detection on the image block by means of a deep neural network, to obtain a vehicle lamp detection result.

18 Claims, 10 Drawing Sheets

(56) References Cited

U.S. PATENT DOCUMENTS

2017/0144585 A1* 5/2017 Ogawa ................ G06K 9/6215
2019/0087672 A1* 3/2019 Wang ................... G06K 9/6288

FOREIGN PATENT DOCUMENTS

| CN | 103984950 A | 8/2014 |
| CN | 105975915 A | 9/2016 |
| CN | 107316010 A | 11/2017 |
| CN | 108509907 A | 9/2018 |

OTHER PUBLICATIONS

First Office Action of the Chinese application No. 201810278351.7, dated Dec. 12, 2019.

* cited by examiner

VEHICLE LAMP DETECTION METHODS AND APPARATUSES, METHODS AND APPARATUSES FOR IMPLEMENTING INTELLIGENT DRIVING, MEDIA AND DEVICES

CROSS-REFERENCE TO RELATED APPLICATIONS

The present application is a continuation of International Application No. PCT/CN2019/079300 filed on Mar. 22, 2019, which claims priority to Chinese Patent Application No. 201810278351.7 filed on Mar. 30, 2018. The disclosures of these applications are hereby incorporated by reference in their entirety.

BACKGROUND

In intelligent driving technologies, accurately detecting and determining vehicle surrounding information is significant for decisions such as selecting a driving path for an intelligent driving vehicle and evading and braking a vehicle.

A vehicle lamp on the vehicle may often function as delivering corresponding information (for example, a left turn, a right turn, a brake, etc.) to other vehicles and pedestrians. Accurately identifying information delivered by the vehicle lamps of the other vehicles in a driving environment has a certain meaning for intelligent driving decisions.

SUMMARY

The present disclosure relates to computer visual technologies, in particular, to vehicle lamp detection methods, vehicle lamp detection apparatuses, methods for training neural networks, apparatuses for training neural networks, methods for implementing intelligent driving, apparatuses for implementing intelligent driving, electronic devices, computer-readable storage media, and computer program products.

Embodiments of the present disclosure provide technical solutions for vehicle lamp detection, training neural networks, and intelligent driving.

According to an aspect of the embodiments of the present disclosure, a vehicle lamp detection method is provided. The method includes: obtaining an image block including an image of a vehicle; and performing vehicle lamp detection on the image block by means of a deep neural network, to obtain a vehicle lamp detection result. According to a further aspect of the embodiments of the present disclosure, a method for training a neural network is provided. The method includes: obtaining a sample image block including an image of a vehicle; performing vehicle lamp detection on the sample image block by means of a deep neural network to be trained, to obtain a vehicle lamp detection result; and using a difference between the vehicle lamp detection result and the vehicle lamp annotation information of the sample image block as guidance information to perform supervised learning on the deep neural network to be trained.

According to a further aspect of the embodiments of the present disclosure, a method for implementing intelligent driving is provided. The method includes: obtaining an image block including an image of a vehicle; performing vehicle lamp detection on the image block by means of a deep neural network, to obtain a vehicle lamp detection result; determining vehicle lamp indication information according to vehicle lamp detection results of multiple image blocks having a timing sequence relation; and generating drive control information or drive early warning prompt information according to the vehicle lamp indication information.

According to a further aspect of the embodiments of the present disclosure, a vehicle lamp detection apparatus is provided. The apparatus includes: a memory storing processor-executable instructions; and a processor arranged to execute the stored processor-executable instructions to perform steps of: obtaining an image block comprising an image of a vehicle; and performing vehicle lamp detection on the image block by means of a deep neural network, to obtain a vehicle lamp detection result.

According to a further aspect of the embodiments of the present disclosure, a vehicle lamp detection apparatus is provided. The apparatus includes: an image block obtaining module, configured to obtain an image block including an image of a vehicle; and a first vehicle lamp detection module, configured to perform vehicle lamp detection on the image block by means of a deep neural network, to obtain a vehicle lamp detection result.

According to a further aspect of the embodiments of the present disclosure, an apparatus for training a neural network is provided. The apparatus includes: a sample image block obtaining module, configured to obtain a sample image block including an image of a vehicle; a second vehicle lamp detection module, configured to perform vehicle lamp detection on the sample image block by means of a deep neural network to be trained, to obtain a vehicle lamp detection result; and a supervision module, configured to use a difference between the vehicle lamp detection result and the vehicle lamp annotation information of the sample image block as guidance information to perform supervised learning on the deep neural network to be trained.

According to a further aspect of the embodiments of the present disclosure, an apparatus for implementing intelligent driving is provided. The apparatus includes: an image block obtaining module, configured to obtain an image block including an image of a vehicle; a first vehicle lamp detection module, configured to perform vehicle lamp detection on the image block by means of a deep neural network, to obtain a vehicle lamp detection result; a vehicle lamp indication determining module, configured to determine vehicle lamp indication information according to vehicle lamp detection results of multiple image blocks having a timing sequence relation; and an intelligent control module, configured to generate drive control information or drive early warning prompt information according to the vehicle lamp indication information.

According to a further aspect of the embodiments of the present disclosure, an electronic device is provided. The electronic device includes: a memory, configured to store a computer program; and a processer, configured to execute the computer program stored in the memory, where when the computer program is executed, the method according to any one of the embodiments of the present disclosure is implemented.

According to a further aspect of the embodiments of the present disclosure, an electronic device is provided. The electronic device includes: a processor and an apparatus according to any of the embodiments of the present disclosure; where when the processor runs the apparatus, the units in the apparatus according to any of the embodiments of the present disclosure are run According to a further aspect of the embodiments of the present disclosure, a non-transitory computer-readable storage medium is provided. The non-transitory computer-readable storage medium has stored thereon computer-readable instructions that, when executed by a processor, cause the processor to execute a vehicle lamp detection method, the method including: obtaining an image block comprising an image of a vehicle; and performing vehicle lamp detection on the image block by means of a deep neural network, to obtain a vehicle lamp detection result.

According to a further aspect of the embodiments of the present disclosure, a computer program is provided. The computer program includes computer instructions, where when the computer instructions are run in a processor of a device, the method according to any of the embodiments of the present disclosure is implemented.

According to yet another aspect of the embodiments of the present disclosure, a computer program product is provided, including a computer-readable code, where when the computer-readable code runs in a device, a processor in the device executes for implementing the method according to any of the embodiments of the present disclosure.

The following further describes in detail the technical solutions of the present disclosure with reference to the accompanying drawings and embodiments.

BRIEF DESCRIPTION OF DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
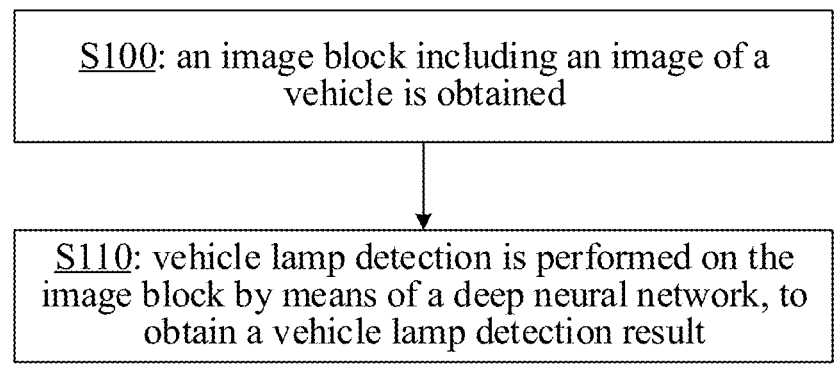
FIG. 1 is a flowchart of a vehicle lamp detection method provided by embodiments of the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each section shown in the accompanying drawings is not drawn in an actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the description in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, Personal Computer (PC) systems, server computer systems, thin clients, thick clients, handheld or laptop devices, microprocessor-based systems, set top boxes, programmable consumer electronics, network PCs, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like, to perform specific tasks or implement specific abstract data types. The computer systems/servers may be implemented in the distributed cloud computing environments in which tasks are performed by remote processing devices linked via a communications network. In the distributed computing environments, the program modules may be located in local or remote computing system storage media including storage devices.

FIG. 1 is a flowchart of a vehicle lamp detection method provided by embodiments of the present disclosure. The method may be performed by any electronic device, such as a terminal device, a server, a mobile device, and a vehicle-mounted device. As shown in FIG. 1, the method of the embodiments includes:

S100, an image block including an image of a vehicle is obtained.

In an optional example, step S100 is performed by a processor by invoking a corresponding instruction stored in a memory, or is performed by an image block obtaining module 700 run by the processor.

S110, vehicle lamp detection is performed on the image block by means of a deep neural network, to obtain a vehicle lamp detection result.

In an optional example, the step S110 is performed by a processor by invoking a corresponding instruction stored in a memory, or is performed by a first vehicle lamp detection module 710 run by the processor.

Using the deep neural network to perform the vehicle lamp detection on the image block having the vehicle in the embodiments of the present disclosure facilitates rapid and accurate obtaining of the vehicle lamp detection result of the image block, thereby facilitating application of the vehicle lamp detection technique provided by the embodiments of the present disclosure to a real-time environment for intelligent driving such as automatic driving and assistant driving, so as to facilitate improvement of the decision accuracy and early warning accuracy of intelligent driving.

In an optional example, the sample image block including the image of the vehicle in the embodiments of the present disclosure may be an entire image to be processed and may also be a partial image including the image of the vehicle in the image to be processed. In addition, the image block including the image of the vehicle in the present disclosure may also be the image block obtained by processing the partial image including the image of the vehicle in the image to be processed.

In an optional example, the image to be processed in the embodiments of the present disclosure is a static image such as a picture or photo, or a video frame in a dynamic video, for example, a video frame in a video captured by a camera apparatus disposed in the vehicle. The vehicle in the image to be processed can be the vehicle located behind the vehicle where a camera apparatus is located captured by the camera apparatus (including right astern, side astern, etc.), may also be the vehicle in front of the vehicle where the camera apparatus is located captured by the camera apparatus (including right ahead, side ahead, etc.), and may also be the vehicle at the abeam direction of the vehicle where the camera apparatus is located captured by the camera apparatus. The present disclosure does not limit the specific position relation of the vehicle in the image to be processed with respect to the vehicle where the camera apparatus is located.

In an optional example, the image block is an image to be processed; or the image block is a partial image including an image of a vehicle in the image to be processed; or the image block is an image block obtained by processing the partial image including the image of the vehicle in the image to be processed.

Figure 2:
FIG. 2 is a schematic implementing diagram of an image to be processed provided by the embodiments of the present disclosure.

According to one or more embodiments of the present disclosure, the vehicle included in the image block in the embodiments of the present disclosure may be a whole vehicle (the vehicle at the rightmost in FIG. 2) and may also be a partial vehicle caused due to reasons such as blocking (i.e., a partial vehicle, such as multiple vehicles at the left side in FIG. 2). A specific expressive form of the vehicle in the image to be processed is not limited in the present disclosure.

In an optional example, the obtaining the image block including the image of the vehicle includes:

performing vehicle detection on an image to be processed; and segmenting the image to be processed according to the vehicle detection result, to obtain the image block including the image of the vehicle.

According to one or more embodiments of the present disclosure, in the embodiments of the present disclosure, vehicle detection can be performed on the image to be processed so as to obtain the vehicle detection result, thereby segmenting the image to be processed according to the vehicle detection result; the image block including the image of the vehicle can be obtained, so as to facilitate improving the accuracy of the vehicle lamp detection. Under the condition that the image to be processed includes multiple vehicles, in the present disclosure, multiple image blocks including the image of the vehicle can be obtained by segmenting the image to be processed. The vehicle detection result is vehicle external frame information, for example, coordinates of two vertexes located on a diagonal line of the vehicle external frame.

In an optional example, the performing the vehicle detection on the image to be processed includes:

performing vehicle detection on the image to be processed using a vehicle detection model, to obtain vehicle external frame information in the image to be processed.

In the embodiments of the present disclosure, the neural network is used to perform vehicle detection on the image to be processed, thereby obtaining the vehicle detection result according to information output by the neural network. For example, the embodiments of the present disclosure may use a vehicle detection model (the vehicle detection model may be the neural network for vehicle detection) etc. to perform vehicle detection processing on the image to be processed. In some optional examples, the vehicle detection model in the embodiments of the present disclosure may be a Region-based Convolutional Neural Network (R-CNN), Fast R-CNN, or Faster R-CNN. The present disclosure does not limit the specific implementing mode of performing vehicle detection processing on the image to be processed to obtain the image block including the image of the vehicle. The present disclosure does not limit the specific structure of the vehicle detection model (for example, the neural network for the vehicle detection), either. In the embodiments of the present disclosure, using the vehicle detection model to detect the vehicle from the image to be processed and segmenting from the image to be processed from the image block including the image of the vehicle facilitate reducing interferences of non-vehicle information in the image to be processed on the vehicle lamp detection, thereby facilitating reduction of the virtual detection rate of the vehicle lamp detection, so as to facilitate improvement of the accuracy of the vehicle lamp detection.

In an optional example, the size of the image block in the embodiments of the present disclosure is usually related to the requirement of a deep neural network for the size of an input image, for example, the size of the image block is 256×256. The deep neural network in the present disclosure is the deep neural network for vehicle lamp detection. To obtain the image block with a predetermined size, in the embodiments of the present disclosure, the image to be processed may first be scaled, and then the scaled image to be processed according to the predetermined size is segmented to obtain the image block including the image of the vehicle. In the present disclosure, the image to be processed can be scaled according to the vehicle detection result (for example, vehicle external frame information), so that the cut image block including the image of the vehicle has the predetermined size. Under the condition that the vehicle detection result for the image to be processed includes multiple pieces of vehicle external frame information, in the embodiments of the present disclosure, for the vehicle external frame information, correspondingly scaling the image to be processed enables at least one image block obtained based on the image to be processed to respectively have the predetermined size. In addition, in the embodiments of the present disclosure, segmenting can first be implemented and scaling can then be implemented. The embodiments of the present disclosure do not limit the size of the image block and the specific implementing mode of the scaling processing.

In an optional example, the performing the vehicle detection on the image to be processed further includes:

performing on multiple images to be processed having a timing sequence relation, to obtain corrected vehicle external frame information in the multiple images to be processed.

In the embodiments of the present disclosure, for the vehicle detection result output by the neural network (for example, the vehicle detection model), at least one of vehicle external frame leak detection or vehicle external frame smoothing processing can be executed (for example, before segmenting the image to be processed, executing the vehicle external frame leak detection and vehicle external frame smoothing processing), thereby facilitating the improvement of the accuracy of the vehicle detection result, so as to facilitate the improvement of the accuracy of the vehicle lamp detection result. In an optional example, under the condition that vehicle detection is performed on multiple video frames in a video, the multiple video frames usually have a timing sequence relation (for example, video frames continuously arranged in the video, and for example again, frame drawing for the video and multiple continuously drawn video frames formed based on a frame drawing result); in the embodiments of the present disclosure, the vehicle external frame leak detection and vehicle external frame smoothing processing are performed on the video frames (i.e., the image to be processed) having the timing sequence relation, so as to obtain the vehicle external frame information by means of leak detection of the vehicle detection model and perform position correction on the vehicle external frame information output by the vehicle detection model. For example, according to the vehicle external frames in the multiple video frames located before the n2-th video frame, the vehicle external frames in the n2-th video frame that are not detected are complemented; furthermore, for example, according to the vehicle external frames in the multiple video frames located before the n2-th video frame, the positions of the corresponding vehicle external frames in the n2-th video frame are corrected. In the embodiments of the present disclosure, according to multiple pieces of vehicle external frame information after the vehicle external frame leak detection and the vehicle external frame smoothing processing, the corresponding images to be processed are segmented respectively so as to obtain the multiple image blocks including the image of the vehicle having the timing sequence relation.

In an optional example, the performing the vehicle external frame leak detection and/or the smoothing processing on the multiple images to be processed having the timing sequence relation includes:

obtaining a vehicle identifier corresponding to at least one vehicle external frame according to the multiple images to be processed having the timing sequence relation and the vehicle external frame information thereof; and performing the vehicle external frame leak detection and/or the vehicle external frame smoothing processing on at least one of the multiple images to be processed according to the vehicle identifier corresponding to the at least one vehicle external frame.

In the embodiments of the present disclosure, the image blocks in the multiple images to be processed having the timing sequence relation (i.e., the vehicle external frame information) can be first obtained; then the vehicle external frame leak detection and the vehicle external frame smoothing processing are then performed on the multiple images to be processed having the timing sequence relation and the vehicle external frame information.

In an optional example, in the embodiments of the present disclosure, an optional example of obtaining the image block in the multiple images to be processed having the timing sequence relation is: respectively providing the multiple images to be processed having the timing sequence relation and the vehicle external frame information in the at least one of the multiple images to be processed to a vehicle tracking model (the vehicle tracking model may be an article tracking model of the vehicle for the target object); in the embodiments of the present disclosure, the vehicle identifier corresponding to the at least one vehicle external frame is obtained according to information output by the vehicle tracking model. Hence, in the embodiments of the present disclosure, a respective association relation between at least one vehicle and a corresponding image to be processed is successfully established. Since the image block in the embodiments of the present disclosure is generated by segmenting the image to be processed based on the vehicle external frame information, the vehicle identification corresponding to the vehicle external frame is also be referred to as an image block identifier; the image block identifiers of the image blocks having the same vehicle are normally the same, while the image block identifiers of the image blocks having different vehicles are normally different. Hence, the vehicle lamp detection of the vehicle under the condition of multiple vehicles is facilitated.

In an optional example, the vehicle tracking model in the embodiments of the present disclosure may be a Convolutional Neural Network (CNN) or a Recurrent Neural Networks (RNN) based on adjacent front and back two video frame comparison.

In an optional example, the performing the vehicle external frame leak detection and/or the vehicle external frame smoothing processing on the at least one of the multiple images to be processed according to the vehicle identifier corresponding to the at least one vehicle external frame includes:

for a vehicle identifier, predicting a position of a vehicle external frame having the vehicle identifier in an m2-th image to be processed according to positions of vehicle external frames having the vehicle identifier in n2 images to be processed in front of the m2-th image to be processed; and performing vehicle external frame addition or vehicle external frame position correction processing on the m2-th image to be processed based on the predicted position of the vehicle external frame.

In the embodiments of the present disclosure, according to the multiple images to be processed having the timing sequence relation and the image block identifiers of the multiple images to be processed, the vehicle external frame leak detection and the vehicle external frame smoothing processing are executed; for example, the following formula (1) is used for executing the vehicle external frame leak detection and vehicle external frame smoothing processing for the current video frame:

$$\Delta x = a_1 t^2 + b_1 t + c_1$$

$$\Delta y = a_2 t^2 b_2 t + c_2$$

$$\Delta w = a_3 t^2 b_3 t + c_3$$

$$\Delta h = a_4 t^2 + b_4 t + c_4 \qquad \text{formula (1)}$$

In the formula (1), $a_1$, $a_2$, $a_3$, $a_4$, $b_1$, $b_2$, $b_3$, $b_4$, $c_1$, $c_2$, $c_3$, and $c_4$ are all parameters for a linear equation (i.e., formula (1)); t represents a t-th moment before the current moment (for example, t=0, t=8, each moment corresponds to a video frame, i.e., each moment corresponds to an image to be processed); $\Delta x$ represents a difference between a central point horizontal coordinate of the vehicle external frame in a preceding video frame and a central point horizontal coordinate of the vehicle external frame having the same vehicle identifier in the next video frame; $\Delta y$ represents a difference between a central point vertical coordinate of the vehicle external frame in a preceding video frame and a central point vertical coordinate of the vehicle external frame having the same vehicle identifier in the next video frame; $\Delta w$ represents a difference between a width of the vehicle external frame in a preceding video frame and a width of the vehicle external frame having the same vehicle identifier in the next video frame; $\Delta h$ represents a difference between a height of the vehicle external frame in a preceding video frame and a height of the vehicle external frame having the same vehicle identifier in the next video frame.

According to one or more embodiments of the present disclosure, the performing vehicle external frame addition or vehicle external frame position correction processing on the m2-th image to be processed based on the predicted position of the vehicle external frame includes:

adding the vehicle external frame to the m2-th image to be processed according to the predicted position of the vehicle external frame under the condition that no vehicle external frame having the vehicle identifier exists in the m2-th image to be processed; or performing weighted average processing on the predicted position of the vehicle external frame and the position of the vehicle external frame having the vehicle identifier in the m2-th image to be processed under the condition that the vehicle external frame having the vehicle identifier exists in the m2-th image to be processed.

In the embodiments of the present disclosure, the parameters $a_1$, $a_2$, $a_3$, $a_4$, $b_1$, $b_2$, $b_3$, $b_4$, $c_1$, $c_2$, $c_3$, and $c_4$ in the linear equation in formula (1) are calculated according to the vehicle external frame information having the same vehicle identifier in the preceding N (for example, N=8) video frames (i.e., the preceding N moments) of the current video frames (i.e., the current moment). Therefore, in the embodiments of the present disclosure, under the condition that the parameters of the formula (1) are known, $\Delta x$, $\Delta y$, $\Delta w$, and $\Delta h$ corresponding to the current video frame are calculated using the formula (1); for a vehicle identifier, in the embodiments of the present disclosure, according to the position of the vehicle external frame having the vehicle identifier in the preceding video frame of the current video frame and the calculated $\Delta x$, $\Delta y$, $\Delta w$, and $\Delta h$ corresponding to the current video frame, the position of the vehicle external frame having the vehicle identifier in the current video frame is predicted; if the current video frame does not have the vehicle external frame having the vehicle identifier, in the embodiments of the present disclosure, according to the predicted position of the vehicle external frame, the vehicle external frame is added to the current video frame, thereby implementing the vehicle external frame leak detection processing on the current video frame; if the current video frame has the vehicle external frame having the vehicle identifier, in the embodiments of the present disclosure, weighted averaging is executed according to the predicted position of the vehicle external frame and the position of the vehicle external frame having the vehicle identifier in the current video frame, thereby implementing the smoothing processing on the vehicle external frame having the vehicle identifier in the current video frame.

In addition, in the embodiments of the present disclosure, existing other leak detection processing and smoothing processing techniques are used for performing the vehicle external frame leak detection processing and the vehicle external frame smoothing processing on the multiple video frames. The embodiments of the present disclosure do not limit the specific implementing mode of performing vehicle external frame leak detection processing and the vehicle external frame smoothing processing on the image to be processed. The embodiments of the present disclosure do not limit the specific structures of the vehicle tracking model, either.

In an optional example, the deep neural network in the embodiments of the present disclosure may use the deep neural network based on region detection; for example, Region-based Convolutional Neural Network (R-CNN) or Faster R-CNN are used. The network structure of the deep neural network may be flexibly designed according to actual requirements for extracting the vehicle lamp detection results; the embodiments of the present disclosure do not limit the specific network structure of the deep neural network; for example, the deep neural network in the embodiments of the present disclosure may include, but not limited to, a convolutional layer, a nonlinear Relu layer, a pooling layer, and a full connection layer. The more the number of layers included by the deep neural network, the deeper the network. Furthermore, for instance, the network structure of the deep neural network of the embodiments of the present disclosure may adopt, but not limited to, network structures adopted by neural networks such as ALexNet, a Deep Residual Network (ResNet), or Visual Geometry Group Network (VGGnet).

According to one or more embodiments of the present disclosure, in the embodiments of the present disclosure, the deep neural network is obtained by training using a sample image block having vehicle lamp annotation information, so that the trained deep neural network has the capability of accurately detecting a vehicle lamp state. To improve the training efficiency of the neural network, the vehicle lamp annotation information of the sample image block includes: at least one or more of vehicle lamp external frame information annotation information, vehicle lamp on-and-off state annotation information, and vehicle lamp orientation annotation information. Reference may be made to the descriptions for FIG. 3 for the process of training the deep neural network. Descriptions are not made herein repeatedly.

In an optional example, in the embodiments of the present disclosure, the vehicle lamp detection result output by the deep neural network includes, but not limited to, at least one of the vehicle lamp external frame information, the vehicle lamp on-and-off state, or the vehicle lamp orientation. For example, the deep neural network outputs the vehicle lamp external frame information, the vehicle lamp on-and-off state, and the vehicle lamp orientation. The vehicle lamp external frame information normally refers to information capable of showing the position of the vehicle lamp external frame in the image block (for example, the coordinates of the two vertexes of the diagonal line of the vehicle lamp external frame on the image block), therefore, in the embodiments of the present disclosure, the position of the vehicle lamp in the image to be processed is determined according to the position of the vehicle lamp external frame in the image block (for example, the coordinates of the two vertexes of the diagonal line of the vehicle lamp external frame on the image to be processed). Certainly, the vehicle lamp external frame information output by the deep neural network can also directly be information of the position of the vehicle lamp external frame in the image to be processed (for example, the coordinates of the two vertexes of the diagonal line of the vehicle lamp external frame on the image block to be processed). The vehicle lamp on-and-off state normally shows whether the vehicle lamp is in an on state or an off state. The vehicle lamp orientation normally is used for indicating the orientation of the vehicle lamp in the vehicle, for example, the vehicle lamp orientation may be: the left front vehicle lamp, the right left vehicle lamp, the left rear vehicle lamp, or the right rear vehicle lamp.

In an optional example, before the determining the vehicle lamp indication information according to the vehicle lamp detection results of the multiple image blocks having the timing sequence relation, the method further includes: performing vehicle lamp external frame leak detection and/or vehicle lamp external frame smoothing processing on the multiple image blocks having the timing sequence relation according to the vehicle lamp detection results, to obtain corrected vehicle lamp external frame information in the multiple image blocks.

In the embodiments of the present disclosure, at least one of the vehicle lamp external frame leak detection or vehicle lamp external frame smoothing processing is executed for the vehicle lamp detection result output by the deep neural network, so as to facilitate the improvement of the accuracy of the vehicle lamp detection result. In an optional example, under the condition that vehicle detection is performed on multiple image blocks, the multiple image blocks usually have a timing sequence relation (for example, at least one image block in the multiple video frames continuously arranged in the video, and for example again, frame drawing for the video and at least one image block in the multiple continuously drawn video frames formed based on a frame drawing result); in the embodiments of the present disclosure, the vehicle lamp external frame leak detection and vehicle lamp external frame smoothing processing are performed on the multiple image blocks having the timing sequence relation, so as to obtain the vehicle lamp external frame information by means of leak detection of the deep neural network and perform position correction on the vehicle lamp external frame information output by the deep neural network. For example, according to the vehicle lamp external frames in the multiple image blocks located before the n1-th image block, the vehicle lamp external frames in the n1-th image block that are not detected are complemented; furthermore, for example, according to the vehicle lamp external frames in the multiple image blocks located before the n1-th image block, the positions of the corresponding vehicle lamp external frames in the n1-th image block are corrected. In the embodiments of the present disclosure, vehicle lamp indication information analysis is executed according to the at least one piece of vehicle lamp external frame information after the vehicle lamp external frame leak detection and vehicle lamp external frame smoothing processing and other information such as the vehicle lamp on-and-off states.

In an optional example, the performing the vehicle lamp external frame leak detection and/or the vehicle lamp external frame smoothing processing on the multiple image blocks having the timing sequence relation according to the vehicle lamp detection results includes:

obtaining a vehicle lamp identifier corresponding to at least one vehicle lamp external frame according to the multiple image blocks having the timing sequence relation and the vehicle lamp external frame information in the multiple image blocks; and performing the vehicle lamp external frame leak detection and/or the vehicle lamp external frame smoothing processing on at least one of the multiple image blocks according to the vehicle lamp identifier corresponding to the at least one vehicle lamp external frame.

According to one or more embodiments of the present disclosure, in the embodiments of the present disclosure, the vehicle lamp external frame information (the coordinates of two vertexes located on a diagonal line of the vehicle lamp external frame) in the multiple image blocks having the timing sequence relation is first obtained; then the vehicle lamp external frame leak detection processing and the vehicle lamp external frame smoothing processing are executed for the multiple image blocks having the timing sequence relation and the at least one piece of the vehicle lamp external frame information.

In an optional example, in the embodiments of the present disclosure, respectively providing the multiple image blocks having the timing sequence relation and the vehicle lamp external frame information to a vehicle lamp tracking model (the vehicle lamp tracking model may be an article tracking model of the vehicle lamp for the target object); in the embodiments of the present disclosure, the vehicle identifier corresponding to the at least one vehicle lamp external frame is obtained according to information output by the vehicle lamp tracking model. Hence, in the embodiments of the present disclosure, an association relation between the vehicle lamp and the vehicle is successfully established. Different vehicle lamp external frames having the same vehicle lamp identifier generally correspond to the same vehicle lamp of the same vehicle.

In an optional example, performing the vehicle lamp external frame leak detection and/or the vehicle lamp external frame smoothing processing on at least one of the multiple image blocks according to the vehicle lamp identifier corresponding to the at least one vehicle lamp external frame includes:

for a vehicle lamp identifier, predicting a position of a vehicle lamp external frame having the vehicle lamp identifier in an m1-th image block according to positions of vehicle lamp external frames having the vehicle lamp identifier in n1 image blocks in front of the m1-th image block; and performing vehicle lamp external frame addition or vehicle lamp external frame position correction processing on the m1-th image block based on the predicted position of the vehicle lamp external frame.

In the embodiments of the present disclosure, the vehicle lamp external frame leak detection processing and the vehicle lamp external frame smoothing processing are executed according to the multiple image blocks having the timing sequence relation and the vehicle lamp identifier of at least one vehicle lamp external frame included in the multiple image blocks; for example, the formula (1) is used for executing the vehicle lamp external frame leak detection processing and the vehicle lamp external frame smoothing processing for the current image block. In the process of using formula (1) for executing the vehicle lamp external frame leak detection processing and the vehicle lamp external frame smoothing processing, $a_1, a_2, a_3, a_4, b_1, b_2, b_3, b_4, c_1, c_2, c_3,$ and $c_4$ in formula (1) are still parameters for a linear equation; t represents a t-th moment before the current moment (for example, t=0, t=8, each moment corresponds to an image block, i.e., each moment corresponds to a video frame or an image to be processed); $\Delta x$ represents a difference between a central point horizontal coordinate of the vehicle lamp external frame in a preceding image block and a central point horizontal coordinate of the vehicle lamp external frame having the same vehicle lamp identifier in the next image block; Δy represents a difference between a central point vertical coordinate of the vehicle lamp external frame in a preceding image block and a central point vertical coordinate of the vehicle lamp external frame having the same vehicle lamp identifier in the next image block; Δw represents a difference between a width of the vehicle lamp external frame in a preceding image block and a width of the vehicle lamp external frame having the same vehicle lamp identifier in the next image block; Δh represents a difference between a height of the vehicle lamp external frame in a preceding image block and a height of the vehicle lamp external frame having the same vehicle lamp identifier in the next image block.

According to one or more embodiments of the present disclosure, the performing the vehicle lamp external frame addition or the vehicle lamp external frame position correction processing on the m1-th image block based on the predicted position of the vehicle lamp external frame includes:

adding the vehicle external frame to the m1-th image block according to the predicted position of the vehicle lamp external frame under the condition that no vehicle lamp external frame having the vehicle lamp identifier exists in the m1-th image block; or performing weighted average processing on the predicted position of the vehicle lamp external frame and the position of the vehicle lamp external frame having the vehicle lamp identifier in the m1-th image block under the condition that the vehicle lamp external frame having the vehicle lamp identifier exists in the m1-th image block.

In the embodiments of the present disclosure, the parameters $a_1, a_2, a_3, a_4, b_1, b_2, b_3, b_4, c_1, c_2, c_3$, and $c_4$ in the linear equation in formula (1) are calculated according to the vehicle lamp external frame information having the same vehicle lamp identifier in the at least one image block in the preceding N (for example, N=8) image blocks (i.e., the preceding N moments) of the current image block (i.e., the current moment). Therefore, in the embodiments of the present disclosure, under the condition that the parameters of the formula (1) are known, $\Delta x$, $\Delta y$, $\Delta w$, and $\Delta h$ of the current image block are calculated using the formula (1); for a vehicle lamp identifier, in the embodiments of the present disclosure, according to the position of the vehicle lamp external frame having the vehicle lamp identifier in the preceding image block of the current image block and the calculated $\Delta x$, $\Delta y$, $\Delta w$, and $\Delta h$ corresponding to the current image block, the position of the vehicle lamp external frame having the vehicle lamp identifier in the current image block is predicted; if the current image block does not have the vehicle lamp external frame having the vehicle lamp identifier, in the embodiments of the present disclosure, according to the predicted position of the vehicle lamp external frame, the vehicle lamp external frame is added to the current image block, thereby implementing the vehicle lamp external frame leak detection processing on the current image block; if the current image block has the vehicle lamp external frame having the vehicle lamp identifier, in the embodiments of the present disclosure, weighted averaging is executed according to the predicted position of the vehicle lamp external frame and the position of the vehicle lamp external frame having the vehicle lamp identifier in the current image block, thereby implementing the smoothing processing on the vehicle lamp external frame having the vehicle lamp identifier in the current image block.

In addition, in the embodiments of the present disclosure, existing other leak detection processing and smoothing processing techniques are used for performing the vehicle lamp external frame leak detection processing and the vehicle lamp external frame smoothing processing on at least one image block in the at least one video frame. The embodiments of the present disclosure do not limit the specific implementing mode of performing vehicle lamp external frame leak detection processing and the vehicle lamp external frame smoothing processing on the image block in the image to be processed. The present disclosure does not limit the specific structures of the vehicle lamp tracking model, either.

In an optional example, the vehicle lamp indication information is determined according to the vehicle lamp detection results of the multiple image blocks having the timing sequence relation in the embodiments of the present disclosure.

According to one or more embodiments of the present disclosure, the vehicle lamp indication information includes at least one of:

a single-side left vehicle lamp flash, a single-side right vehicle lamp flash, a double-side vehicle lamp flash, a double-side vehicle lamp full off, or a double-side vehicle lamp full on.

According to one or more embodiments of the present disclosure, in the present disclosure, according to the vehicle lamp detection result of multiple image blocks of the same vehicle, the on-and-off state of the same vehicle lamp of the same vehicle within a period of time is counted and the statistical result is determined and identified, thereby obtaining whether the same vehicle lamp of the same vehicle is in a flash state, an always-on state, or an always-off state. Therefore, in the embodiments of the present disclosure, the vehicle lamp indication information of the vehicle is determined by combining the vehicle lamp orientation and the state where other vehicle lamp of the same vehicle is located as: the signal side left vehicle lamp flash, the single side right vehicle lamp flash, the double-side vehicle lamp flash, the double-side vehicle lamp full off, or the double-side vehicle lamp full on. The signal side left vehicle lamp flash (the right vehicle lamp is not on) generally represents the vehicle is moving to the left side (for example, doubling towards the left, left turn, etc.). The signal side right vehicle lamp flash (the left vehicle lamp is not on) generally represents the vehicle is moving to the right side (for example, doubling towards the right, a right turn, etc.). The double-side vehicle lamp flash generally represents that a vehicle has a special state such as emergency or temporary parking. The double-side vehicle lamp full off represents normal driving without changing the direction. The double-side vehicle lamp full on represents braking and decelerating driving.

In an optional example, the determining the vehicle lamp indication information according to the vehicle lamp detection results of the multiple image blocks having the timing sequence relation includes:

collecting statistics about vehicle lamp on-and-off states for multiple vehicle lamp external frames having a timing sequence relation corresponding to a same vehicle lamp of a same vehicle and determining the vehicle indication information according to a statistical result.

In the embodiments of the present disclosure, the timing sequence information of an instant state of the same vehicle lamp is used to perform finer classification on the vehicle lamp state. The trend of an entire vehicle is determined by combining the states of the two vehicle lamps (for example, two rear vehicle lamps) of the same vehicle, so that accurate, rapid, and intuitive information are provided to a vehicle environment sensing system in the intelligent drive system, thereby facilitating help of the intelligent driving system for decision, so as to facilitate more secured and faster driving of the vehicle.

In an optional example, in the embodiments of the present disclosure, the following formulas (2)-(5) are used to collect statistics about the on-and-off states of the same vehicle lamp of the same vehicle within the period of time:

$$c_i = \sum_{n=i}^{i+14} s_n \qquad \text{formula (2)}$$

$$A_i = \begin{cases} 0, & C_i \leq 8 \\ 1, & 8 < C_i \leq 13 \\ 2, & C_i > 13 \end{cases} \qquad \text{formula (3)}$$

$$D_m = \text{count}(A_i = m) \qquad \text{formula (4)}$$

$$S_t = \begin{cases} 2, & D_1 = 0, D_2 \neq 0 \\ 1, & D_2 = 0, D_1 \neq 0 \\ 0, & \text{other} \end{cases} \qquad \text{formula (5)}$$

In the formula (2), i represents an i-th phase; a phase generally includes multiple moments; $s_n$ represents the on-and-off state of the vehicle lamp at an n-th moment; a value of $s_n$ is 0, which represents that the vehicle lamp is in an off state at the n-the moment; a value of $s_n$ is 1, which represents that the vehicle lamp is in an on state at the n-the moment; $C_i$ represents the times for the vehicle lamp to be in an on state in the i-th phase.

In the formula (3), $A_t$ is used for representing different value ranges of $C_i$ by means of different values.

In the formula (4), $D_m$ represents collecting statistics about the number of $A_t$ with the value of m.

In the formula (5), $S_t$ represents the on-and-off state of the vehicle lamp within a period of time; if the value of $S_t$ is 2, it represents that the vehicle lamp is in an always-on state; if the value of $S_t$ is 1, it represents that the vehicle lamp is in a flash state; if the value of $S_t$ is 0, it represents that the vehicle lamp is in an always-off state.

It should be specially explained that the formulas (2)-(5) are only optional collecting statistics about modes; in the embodiments of the present disclosure, other collecting statistics about modes may be used for determining the vehicle lamp indication information, and the collecting statistics about modes may be flexibly designed according to actual requirements. The embodiments of the present disclosure do not limit the specific collecting statistics about mode of the vehicle lamp indication information.

Figure 3:
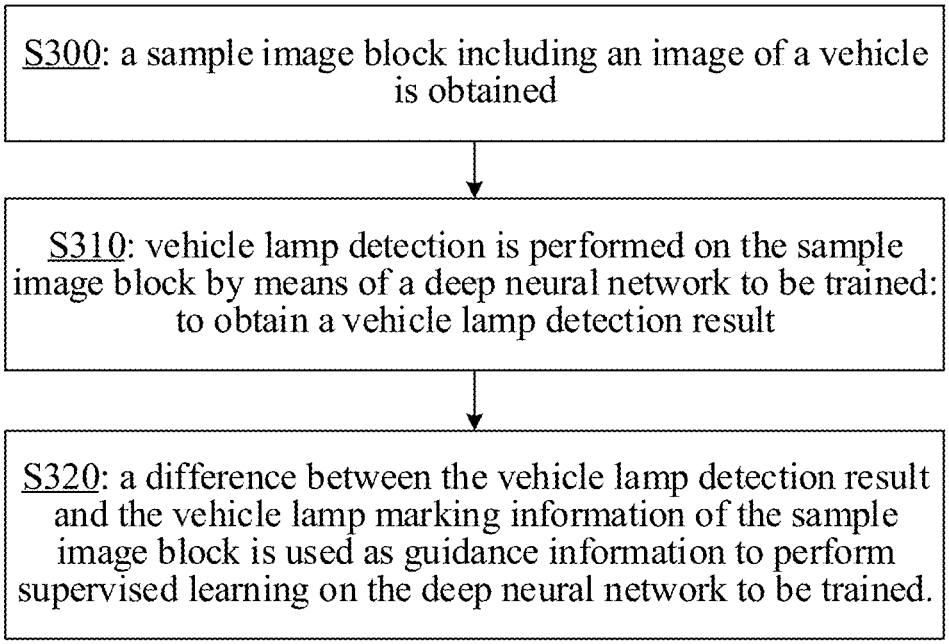
FIG. 3 is a flowchart of a method for training a neural network provided by the embodiments of the present disclosure.

FIG. 3 is a flowchart of a method for training a neural network provided by the embodiments of the present disclosure. The method may be performed by any electronic device, such as a terminal device, a server, a mobile device, and a vehicle-mounted device. As shown in FIG. 3, the method of the embodiments includes: steps S300, S310, and S320. Each step in FIG. 3 is illuminated in detail as follows.

S300, a sample image block including an image of a vehicle is obtained.

In an optional example, step S300 is performed by a processor by invoking a corresponding instruction stored in a memory, or is performed by a sample image block obtaining module 800 run by the processor.

S310, vehicle lamp detection is performed on the sample image block by means of a deep neural network to be trained, to obtain a vehicle lamp detection result.

In an optional example, the step S310 is performed by a processor by invoking a corresponding instruction stored in a memory, or is performed by a second vehicle lamp detection module 810 run by the processor.

S320, a difference between the vehicle lamp detection result and the vehicle lamp annotation information of the sample image block is used as guidance information to perform supervised learning on the deep neural network to be trained. In an optional example, step S320 may be performed by a processor by invoking a corresponding instruction stored in a memory, and may also be performed by a supervision module 820 run by the processor.

In an optional example, the sample image block including the image of the vehicle in the embodiments of the present disclosure may be an entire image sample and may also be a partial image including the image of the vehicle in the image sample. In addition, the sample image block including the image of the vehicle in the embodiments of the present disclosure may also be the sample image block obtained by processing the partial image including the image of the vehicle in the image sample.

In an optional example, the image sample is obtained from a training data set, and the sample image block including the image of the vehicle in the image sample is obtained. The training data set in the embodiments of the present disclosure includes multiple image samples for training the deep neural network. Under normal conditions, each image sample is provided with the vehicle lamp annotation information; the vehicle lamp annotation information includes, but not limited to, at least one of the vehicle lamp external frame information annotation information, the vehicle lamp on-and-off state annotation information, or the vehicle lamp orientation annotation information. In the embodiments of the present disclosure, one or more image samples may be read from the training data set at one time according to a random reading mode or an image sample arrangement order sequence reading mode.

In an optional example, in the embodiments of the present disclosure, multiple mode can be adopted to obtain the sample image block including the image of the vehicle, for example, in the embodiments of the present disclosure, the image block including the image of the vehicle in the image sample is obtained by means of the neural network. In an optional example, in the embodiments of the present disclosure, the vehicle detection is performed on the image sample, so as to obtain the vehicle detection result, thereby segmenting the image sample according to the vehicle detection result, so that the sample image block including the image of the vehicle can be obtained. Under the condition that the image sample includes multiple vehicles, in the embodiments of the present disclosure, multiple sample image blocks including the image of the vehicle can be obtained by means of segmenting the image sample. The vehicle detection result is vehicle external frame information, for example, coordinates of two vertexes located on a diagonal line of the vehicle external frame.

In an optional example, in the embodiments of the present disclosure, the vehicle detection model (also referred to as the target object being the article detection mode of the vehicle) and the like are used to perform vehicle detection on the read image sample. The embodiments of the present disclosure do not limit the specific implementing mode of performing vehicle detection on the image sample to obtain the sample image block including the image of the vehicle.

In an optional example, the size of the sample image block in the embodiments of the present disclosure is usually related to the requirement of a deep neural network for the size of an input image, for example, the size of the sample image block is 256×256. To obtain the sample image block having the predetermined size, in the embodiments of the present disclosure, after vehicle detection is executed, the image sample is scaled according to the vehicle detection result, and then according to the predetermined size and the vehicle external frame information (for example, a central position of the vehicle external frame), the sample image block having the vehicle is obtained by segmenting the scaled image sample. Under the condition that the vehicle detection result includes multiple pieces of the vehicle external frame information, in the embodiments of the present disclosure, for at least one piece of the vehicle external frame information, the image sample is scaled by corresponding multiples, separately, so that the obtained at least sample image block separately has the predetermined size. The embodiments of the present disclosure do not limit the size of the sample image block and the specific implementing mode of the scaling processing.

In an optional example, in the embodiments of the present disclosure, the deep neural network to be trained would perform vehicle detection on the input at least one sample image block, and output the vehicle lamp detection result, for example, outputting at least one of the vehicle lamp external frame information, the vehicle lamp on-and-off state, or the vehicle lamp orientation. Under normal conditions, the deep neural network to be trained outputs the vehicle lamp external frame information, the vehicle lamp on-and-off state, and the vehicle lamp orientation for the at least one sample image block. The vehicle lamp external frame information normally refers to information capable of showing the position of the vehicle lamp external frame in the sample image block (for example, the coordinates of the two vertexes of the diagonal line of the vehicle lamp external frame on the sample image block), therefore, in the embodiments of the present disclosure, the position of the vehicle lamp in the image sample is determined according to the position of the vehicle lamp external frame in the image block (for example, the coordinates of the two vertexes of the diagonal line of the vehicle lamp external frame on the image sample).

Certainly, the vehicle lamp external frame information output by the deep neural network to be trained is also directly the information of the position of the vehicle lamp external frame in the image sample. The vehicle lamp on-and-off state normally shows whether the vehicle lamp is in an on state or an off state. The vehicle lamp orientation normally is used for indicating the orientation of the vehicle lamp in the vehicle, for example, the vehicle lamp orientation may be: the left front vehicle lamp, the right left vehicle lamp, the left rear vehicle lamp, or the right rear vehicle lamp.

In an optional example, in the embodiments of the present disclosure, the difference between the vehicle lamp detection result of the at least one sample image block output by the deep neural network to be trained and the vehicle lamp annotation information of the corresponding sample image block is used as the guidance information; reducing the difference is the goal; a corresponding loss function is used for supervised learning of the deep neural network to be trained.

In an optional example, when the training for the deep neural network to be trained meets a predetermined iteration condition, this training process ends. The predetermined iteration condition in the embodiments of the present disclosure includes that the difference between the vehicle lamp detection result output by the deep neural network to be trained and the vehicle lamp annotation information of the image sample meets a predetermined difference requirement. When the difference meets the predetermined difference requirement, this training for the deep neural network to be trained successfully ends. The predetermined iteration condition in the present disclosure also includes: training the deep neural network to be trained, the number of used image samples meeting a predetermined number requirement, etc. Under the condition that the number of used image samples meets the predetermined number requirement but the difference does not meet the predetermined difference condition, this training for the deep neural network to be trained does not succeed. The successfully trained deep neural network is used for performing the vehicle lamp detection processing on the image block including the image of the vehicle.

Figure 4:
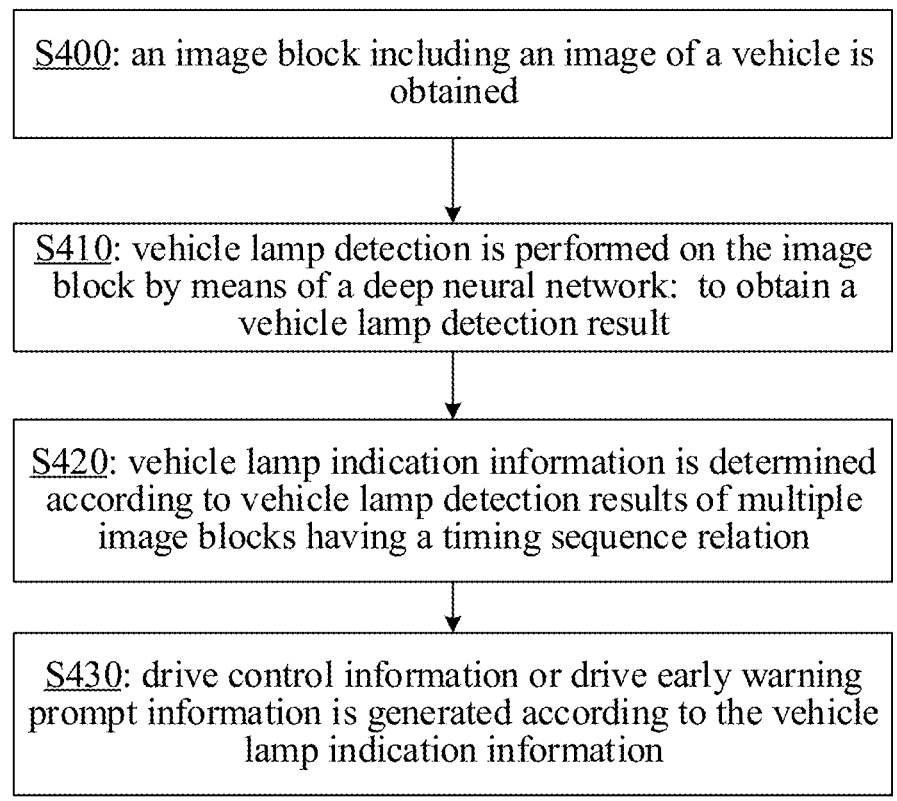
FIG. 4 is a flowchart of a method for implementing intelligent driving provided by the embodiments of the present disclosure.

FIG. 4 is a flowchart of a method for implementing intelligent driving provided by the embodiments of the present disclosure. The method may be performed by any electronic device, such as a terminal device, a server, a mobile device, and a vehicle-mounted device. As shown in FIG. 4, the method of the embodiments includes: steps S400, S410, S420, and S430. Each step in FIG. 4 is illuminated in detail as follows.

S400, an image block including an image of a vehicle is obtained.

In an optional example, step S400 is performed by a processor by invoking a corresponding instruction stored in a memory, or is performed by an image block obtaining module 700 run by the processor.

S410, vehicle lamp detection is performed on the image block by means of a deep neural network, to obtain a vehicle lamp detection result.

In an optional example, the step S410 is performed by a processor by invoking a corresponding instruction stored in a memory, or is performed by a first vehicle lamp detection module 710 run by the processor.

S420, vehicle lamp indication information is determined according to vehicle lamp detection results of multiple image blocks having a timing sequence relation.

In an optional example, the step S420 is performed by a processor by invoking a corresponding instruction stored in a memory, or is performed by a vehicle lamp indication determining module 720 run by the processor.

S430, drive control information or drive early warning prompt information is generated according to the vehicle lamp indication information.

In an optional example, step S430 may be performed by a processor by invoking a corresponding instruction stored in a memory, and may also be performed by an intelligent control module 730 run by the processor.

In an optional example, the vehicle lamp detection result includes, but not limited to, at least one of the vehicle lamp external frame information, the vehicle lamp on-and-off state, or the vehicle lamp orientation. In a normally condition, the deep neural network outputs the vehicle lamp external frame information, the vehicle lamp on-and-off state, and the vehicle lamp orientation. In an optional example, the vehicle lamp indication information in the embodiments of the present disclosure may include: the single-side left vehicle lamp flash, the single-side right vehicle lamp flash, the double-side vehicle lamp flash, the double-side vehicle lamp full off, and the double-side vehicle lamp full on. In addition, in the embodiments of the present disclosure, it can be further distinguished whether the left vehicle lamp is the left front vehicle lamp or the left rear vehicle lamp. That is, the vehicle lamp indication information includes: the single side left front vehicle lamp flash, the single side left real vehicle lamp flash, the single side right front vehicle lamp flash, the single side right rear vehicle lamp flash, the double-side front vehicle lamp flash, the double-side rear vehicle lamp flash, the double-side front vehicle lamp full off, the double-side rear vehicle lamp full off, the double-side front vehicle lamp full on, the double-side rear vehicle lamp full on, etc.

Figure 5:
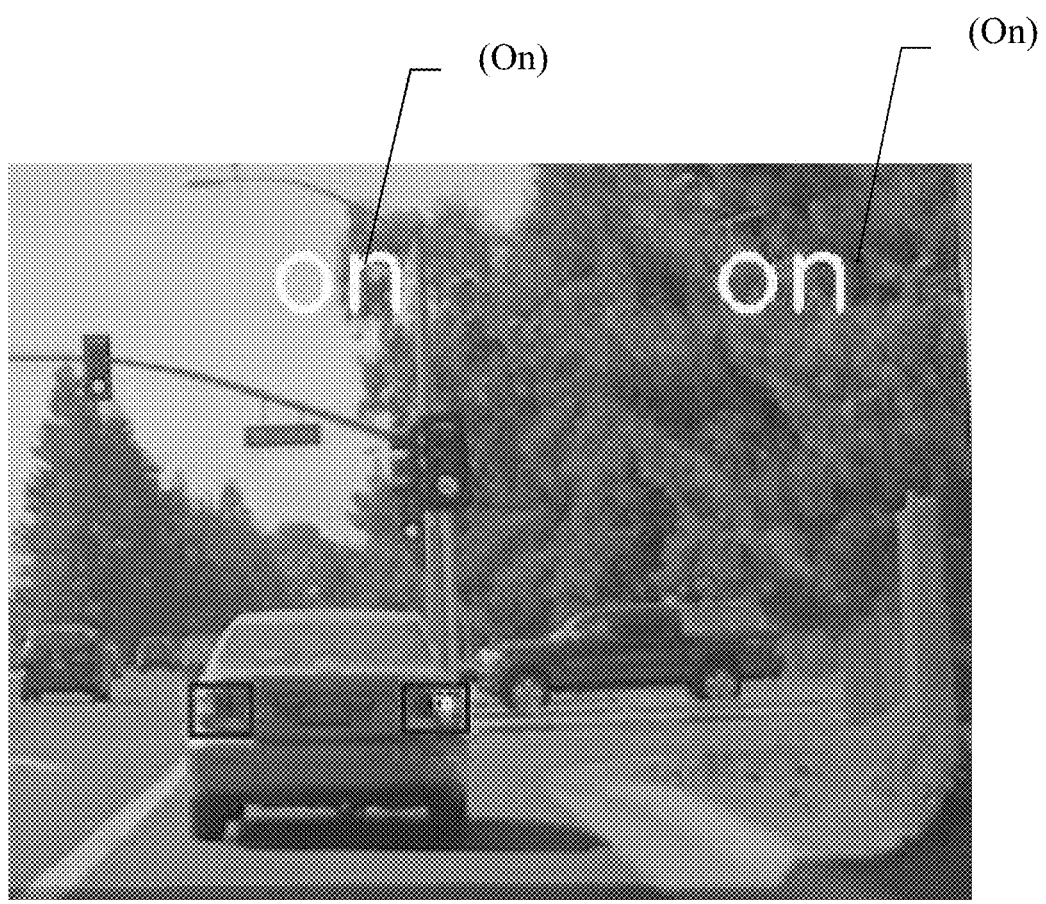
FIG. 5 is a schematic diagram of an embodiment of a vehicle lamp detection result provided by the embodiments of the present disclosure.
Figure 6:
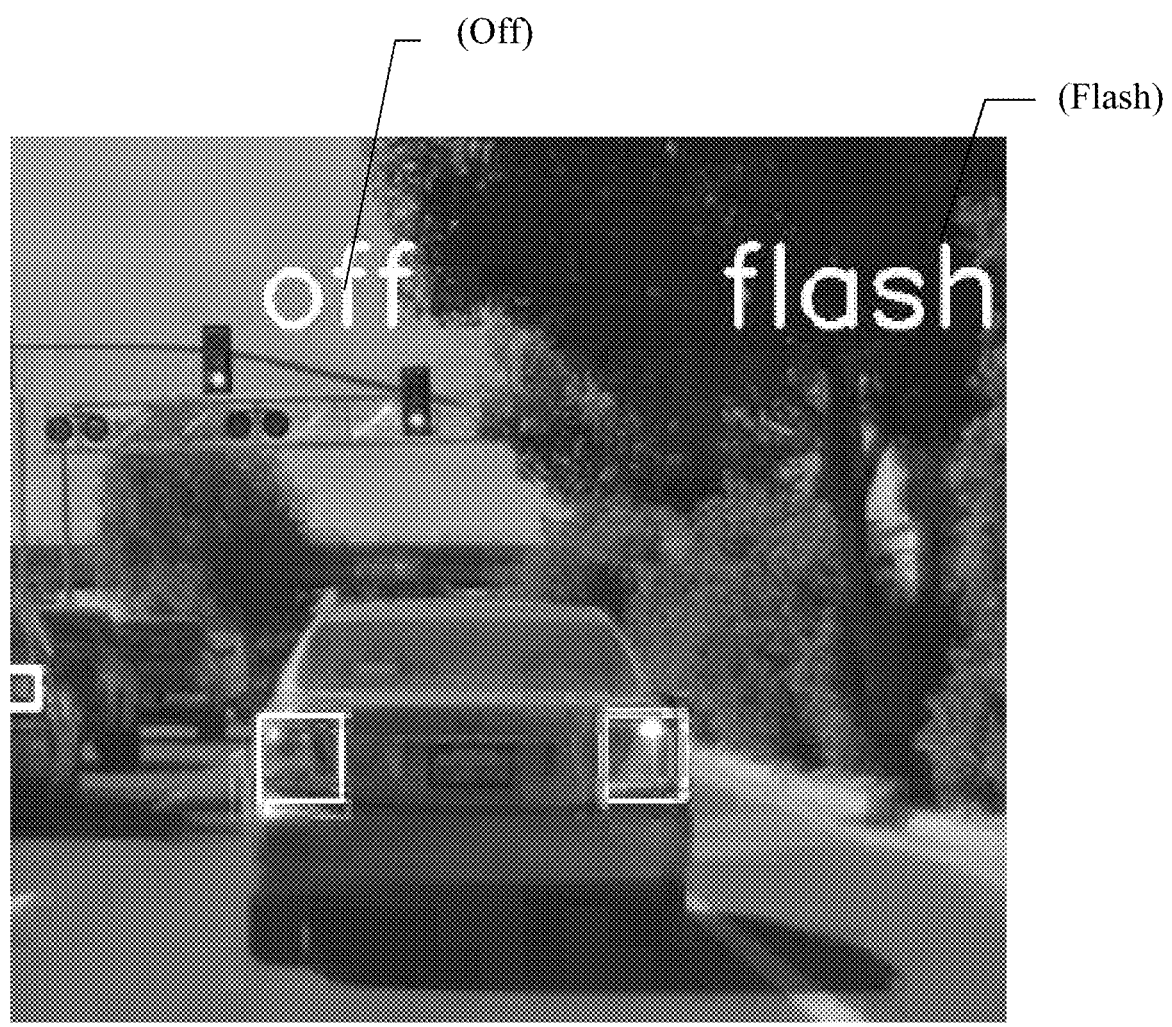
FIG. 6 is a schematic diagram of another embodiment of a vehicle lamp detection result provided by the embodiments of the present disclosure.

An optional example for the double-side rear vehicle lamp full on is shown in FIG. 5; in FIG. 5, "on" at the left side represents that the left side rear vehicle lamp is on; "on" at the right side in FIG. 5 represents the right side rear vehicle lamp is on. An optional example for the single side rear vehicle lamp flash is shown in FIG. 6; in FIG. 6, "off" at the left side represents that the left side rear vehicle lamp is off; "flash" at the right side in FIG. 6 represents the right side rear vehicle lamp is flash.

In an optional example, in the embodiments of the present disclosure, according to the vehicle lamp indication information, the generated drive control information includes: braking and decelerating driving control information, control information of doubling towards the left, control information of doubling towards the right, current driving speed maintaining control information, or accelerating driving speed control information. In the present disclosure, according to the vehicle lamp indication information, the generated drive early warning prompt information includes: front vehicle doubling prompt information, front vehicle decelerating prompt information, front vehicle left/right turn prompt information. The embodiments of the present disclosure do not limit the specific representing modes of the drive control information and the drive early warning prompt information.

Descriptions for FIG. 1 in the method embodiments can be referred to for optional implementing modes for steps S400, S410, and S420, and are not explained in details herein again.

Persons of ordinary skill in the art may understand that: all or some steps for implementing the foregoing method embodiments may be achieved by a program by instructing related hardware; the foregoing program can be stored in a computer-readable storage medium; when the program is executed, steps including the foregoing method embodiments are executed. Moreover, the foregoing storage medium includes: various media capable of storing program codes, such as a Read-Only Memory (ROM), a Random-Access Memory (RAM), a magnetic disk, or an optical disk.

Figure 7:
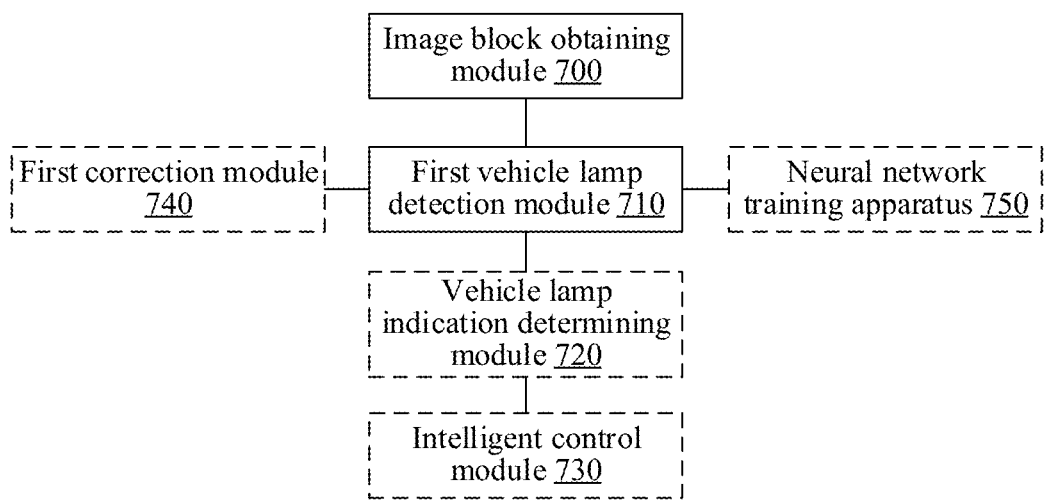
FIG. 7 is a schematic structural diagram of a vehicle lamp detection apparatus provided by the embodiments of the present disclosure.

FIG. 7 is a schematic structural diagram of a vehicle lamp detection apparatus provided by the embodiments of the present disclosure. The apparatus of the embodiments can be used for implementing the vehicle detecting method provided by any embodiment of the present disclosure. As shown in FIG. 7, the apparatus of the embodiments includes: an image block obtaining module 700 and a first vehicle lamp detection module 710.

According to one or more embodiments of the present disclosure, the apparatus includes, but not limited to: one or more of a vehicle lamp indication determining module 720, an intelligent control module 730, a first correction module 740, and an apparatus for training a neural network 750.

The image block obtaining module 700 is configured to obtain an image block including an image of a vehicle.

The first vehicle lamp detection module 710 is configured to perform vehicle lamp detection on the image block by means of a deep neural network, to obtain a vehicle lamp detection result.

The vehicle lamp indication determining module 720 is configured to determine vehicle lamp indication information according to vehicle lamp detection results of multiple image blocks having a timing sequence relation.

The intelligent control module 730 is configured to generate drive control information or drive early warning prompt information according to the vehicle lamp indication information.

The first correction module 740 is configured to perform vehicle lamp external frame leak detection and/or vehicle lamp external frame smoothing processing on the multiple image blocks having the timing sequence relation according to the vehicle lamp detection results, to obtain corrected vehicle lamp external frame information in at least one of the multiple image blocks.

The apparatus for training a neural network 750 is configured to train the deep neural network to be trained using the sample image block having the vehicle lamp annotation information.

In an optional example, the image block obtaining module 700 in the embodiments of the present disclosure includes: a detection module and a segmentation module. The image block obtaining module 700 further includes: a second correction module. The detection module is used to perform vehicle detection on the image to be processed. For example, the detection module performs vehicle detection on the image to be processed using a vehicle detection model, to obtain vehicle external frame information in the image to be processed. The segmentation module is configured to segment the image to be processed according to the vehicle detection result, to obtain the image block including the image of the vehicle. The second correction module is configured to perform vehicle external frame leak detection and/or vehicle external frame smoothing processing on multiple images to be processed having a timing sequence relation, to obtain corrected vehicle external frame information in the at least one of the multiple images to be processed.

In an optional example, the second correction module in the embodiments of the present disclosure includes: a third module and a fourth module. The third module is configured to obtain a vehicle identifier corresponding to at least one vehicle external frame according to the multiple images to be processed having the timing sequence relation and the vehicle external frame information thereof. The fourth module is configured to perform the vehicle external frame leak detection and/or the vehicle external frame smoothing processing on at least one image to be processed according to the vehicle identifier corresponding to the at least one vehicle external frame.

In an optional example, for a vehicle identifier, the fourth module predicts the position of the vehicle external frame having the vehicle identifier in the m2-th image to be processed according to the position of the vehicle external frame having the vehicle identifier in the n2 (for example, 8) images to be processed located in front of the m2-th image to be processed (the current image to be processed as described above); based on the predicted position of the vehicle external frame, the fourth module performs the vehicle external frame addition or vehicle external frame position correction processing on the m2-th image to be processed. For example, under the condition that the m2-th image to be processed does not have the vehicle external frame having the vehicle identifier, the fourth module adds the vehicle external frame to the m2-th image to be processed according to the predicted position of the vehicle external frame, so as to implement leak detection processing; furthermore, for example, under the condition that the m2-th image to be processed has the vehicle external frame having the vehicle identifier, the fourth module performs weighted averaging processing on the predicted position of the vehicle external frame and the position of the vehicle external frame having the vehicle identifier in the m2-th image to be processed, so as to implement the smoothing processing.

In an optional example, the vehicle lamp detection result of the embodiments of the present disclosure includes, but not limited to, at least one of the vehicle lamp external frame information, the vehicle lamp on-and-off state, or the vehicle lamp orientation.

In an optional example, the first correction module 740 in the embodiments of the present disclosure includes: a first unit and a second unit. The first unit is configured to obtain a vehicle lamp identifier corresponding to at least one vehicle lamp external frame according to the multiple image blocks having the timing sequence relation and the vehicle lamp external frame information in the multiple image blocks. The second unit is configured to perform the vehicle lamp external frame leak detection and/or the vehicle lamp external frame smoothing processing on at least one image block according to the vehicle lamp identifier corresponding to the at least one vehicle lamp external frame. For example, the second is further configured to: for a vehicle lamp identifier, predict a position of a vehicle lamp external frame having the vehicle lamp identifier in an m1-th image block according to positions of vehicle lamp external frames having the vehicle lamp identifier in n1 image blocks (e.g. 8) in front of the m1-th image block (a current image block as described above); and performing vehicle lamp external frame addition or vehicle lamp external frame position correction processing on the m1-th image block based on the predicted position of the vehicle lamp external frame. The performing the vehicle lamp external frame addition or the vehicle lamp external frame position correction processing on the m1-th image block based on the predicted position of the vehicle lamp external frame by the second unit includes: adding the vehicle external frame to the m1-th image block according to the predicted position of the vehicle lamp external frame under the condition that no vehicle lamp external frame having the vehicle lamp identifier exists in the m1-th image block. The performing the vehicle lamp external frame addition or vehicle lamp external frame position correction processing on the m1-th image block based on the predicted position of the vehicle lamp external frame by the second unit also includes: performing weighted average processing on the predicted position of the vehicle lamp external frame and the position of the vehicle lamp external frame having the vehicle lamp identifier in the m1-th image block under the condition that the vehicle lamp external frame having the vehicle lamp identifier exists in the m1-th image block.

In an optional example, the vehicle lamp indication information in the embodiments of the present disclosure includes, but not limited to, at least one of the single-side left vehicle lamp flash, the single-side right vehicle lamp flash, the double-side vehicle lamp flash, the double-side vehicle lamp full off, or the double-side vehicle lamp full on. In an optional example, the vehicle lamp indication determining module 720 is further configured to collect statistics about vehicle lamp on-and-off states for multiple vehicle lamp external frames having a timing sequence relation corresponding to a same vehicle lamp of a same vehicle and determine the vehicle indication information according to a statistical result.

In an optional example, the image block in the embodiments of the present disclosure is an image to be processed. The image block in the embodiments of the present disclosure is also a partial image including the image of the vehicle in the image to be processed. The image block in the embodiments of the present disclosure is also an image block obtained by processing the partial image including the image of the vehicle in the image to be processed.

In an optional example, the deep neural network in the embodiments of the present disclosure includes: a Faster R-CNN.

In an optional example, the apparatus for training a neural network 750 in the embodiments of the present disclosure includes: a sample image block obtaining module 800, a second vehicle lamp detection module 810, and a supervision module 820. The sample image block obtaining module 800 is configured to obtain a sample image block including an image of a vehicle. The second vehicle lamp detection module 810 is configured to perform vehicle lamp detection on the sample image block by means of a deep neural network to be trained, to obtain a vehicle lamp detection result. The supervision module 820 is configured to use a difference between the vehicle lamp detection result and the vehicle lamp annotation information of the sample image block as guidance information to perform supervised learning on the deep neural network to be trained. The vehicle lamp annotation information in the embodiments of the present disclosure includes at least one of: the vehicle lamp external frame information annotation information, the vehicle lamp on-and-off state annotation information, or the vehicle lamp orientation annotation information. Operations executed by at least module in the apparatus for training a neural network 750 can refer to the descriptions for FIG. 3 in the method embodiment above. Please refer to the description for FIG. 8 for the embodiment below for the structure of the apparatus for training a neural network 750. Descriptions are not made herein repeatedly.

In an optional example, operations executed by the image block obtaining module 700, the first vehicle lamp detection module 710, the vehicle lamp indication determining module 720, the intelligent control module 730, and the first correction module 740 and technical effects thereof can refer to the descriptions for FIGS. 1, 2, 4, 5, and 6 in the method embodiment above. Descriptions are not made herein repeatedly.

Figure 8:
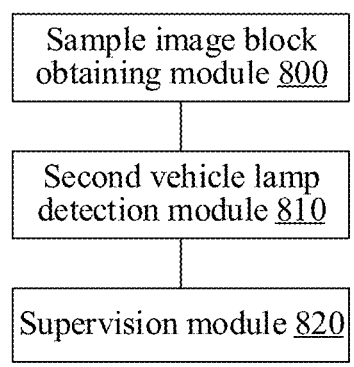
FIG. 8 is a schematic structural diagram of an apparatus for training a neural network provided by embodiments of the present disclosure.

FIG. 8 is a schematic structural diagram of an apparatus for training a neural network provided by embodiments of the present disclosure. The apparatus of the embodiments can be used for implementing the method for training a neural network provided by any embodiment of the present disclosure. As shown in FIG. 8, the apparatus of the embodiments mainly includes: the sample image block obtaining module 800, the second vehicle lamp detection module 810, and the supervision module 820.

The sample image block obtaining module 800 is configured to obtain a sample image block including an image of a vehicle.

The second vehicle lamp detection module 810 is configured to perform vehicle lamp detection on the sample image block by means of a deep neural network to be trained, to obtain a vehicle lamp detection result.

The supervision module 820 is configured to use a difference between the vehicle lamp detection result and the vehicle lamp annotation information of the sample image block as guidance information to perform supervised learning on the deep neural network to be trained.

The vehicle lamp annotation information in the embodiments of the present disclosure includes, but not limited to, at least one of the vehicle lamp external frame information annotation information, the vehicle lamp on-and-off state annotation information, or the vehicle lamp orientation annotation information.

Operations executed by the module in the apparatus for training a neural network 750 and the technical effect thereof can refer to the descriptions for FIG. 3 in the method embodiment above. Descriptions are not made herein repeatedly.

Figure 9:
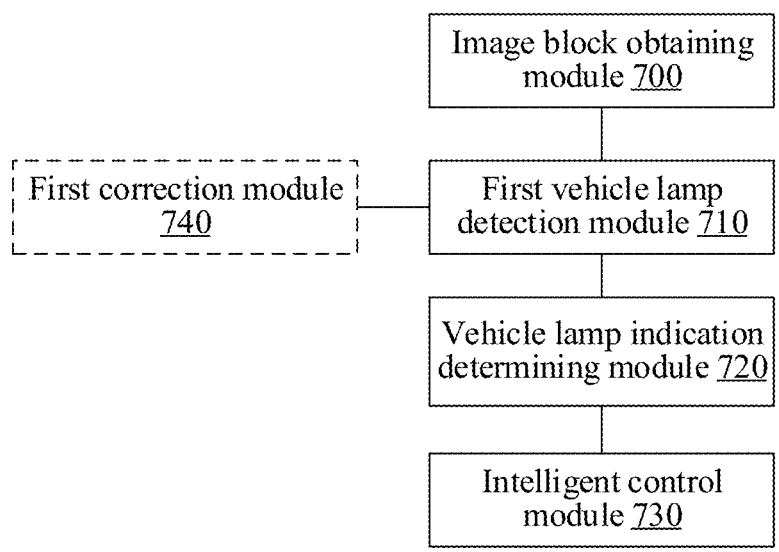
FIG. 9 is a schematic structural diagram of an apparatus for implementing intelligent driving provided by the embodiments of the present disclosure.

FIG. 9 is a schematic structural diagram of an apparatus for implementing intelligent driving provided by the embodiments of the present disclosure. The apparatus of the embodiments can be used for implementing the method for implementing intelligent driving provided by any embodiment of the present disclosure. The apparatus in FIG. 9 mainly includes: the image block obtaining module 700, the first vehicle lamp detection module 710, the vehicle lamp indication determining module 720, and the intelligent control module 730. According to one or more embodiments of the present disclosure, the apparatus further includes a first correction module 740.

The image block obtaining module 700 is mainly configured to obtain an image block including an image of a vehicle.

The first vehicle lamp detection module 710 is mainly configured to perform vehicle lamp detection on the image block by means of a deep neural network, to obtain a vehicle lamp detection result.

The vehicle lamp indication determining module 720 is mainly configured to determine vehicle lamp indication information according to vehicle lamp detection results of multiple image blocks having a timing sequence relation.

The intelligent control module 730 is mainly configured to generate drive control information or drive early warning prompt information according to the vehicle lamp indication information.

The first correction module 740 is mainly configured to perform vehicle lamp external frame leak detection and/or vehicle lamp external frame smoothing processing on the multiple image blocks having the timing sequence relation according to the vehicle lamp detection results, to obtain corrected vehicle lamp external frame information in at least one of the multiple image blocks.

Operations executed by the image block obtaining module 700, the first vehicle lamp detection module 710, the vehicle lamp indication determining module 720, the intelligent control module 730, and the first correction module 740, technical effects thereof, and structures of the modules can refer to the related descriptions for FIGS. 1 and 7 in the method embodiment above. Descriptions are not made herein repeatedly.

Figure 10:
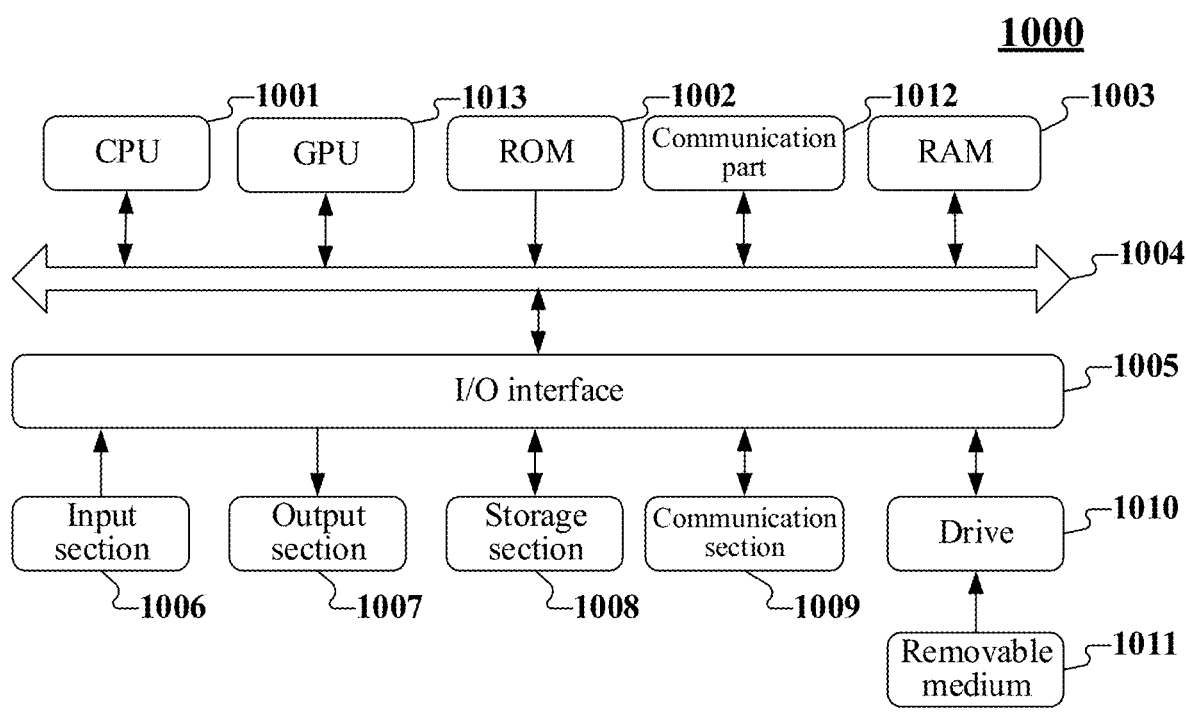
FIG. 10 is a block diagram of an exemplary device for implementing an embodiment of the present disclosure.

FIG. 10 illustrates an exemplary device 1000 suitable for implementing the present disclosure. The device 1000 is a control system/electronic system configured in an automobile, a mobile terminal (such as a smart mobile phone), a PC (such as a desktop computer or a notebook computer), a tablet computer, or a server. In FIG. 10, the device 12 includes one or more processors, a communication part, and the like. The one or more processors are, for example, one or more Central Processing Units (CPUs) 1001 and/or one or more Graphic Processing Units (GPUs) 1013 performing vehicle lamp detection by using one or more neural networks, and the processors may perform various appropriate actions and processing according to executable instructions stored in a Read-Only Memory (ROM) 1002 or executable instructions loaded from a storage section 1008 to a Random Access Memory (RAM) 1003. The communication part 1012 may include, but not limited to, a network card. The network card includes, but not limited to, an Infiniband (IB) network card. The processor may communicate with the ROM 1002 and/or the RAM 1003, to execute executable instructions. The processor is connected to the communication part 1004 via a bus 1012, and communicates with other target devices via the communication part 1012, thereby implementing corresponding steps in the present disclosure.

Reference is made to related descriptions in the foregoing method embodiments for the operations executed by the instructions. Descriptions are not made herein in detail. In addition, the RAM 1003 further stores various programs and data required for operations of an apparatus. The CPU 1001, the ROM 1002, and the RAM 1003 are connected to each other via the bus 1004.

In the presence of the RAM 1003, the ROM 1002 is an optional module. The RAM 1003 stores executable instructions, or writes the executable instructions into the ROM 1002 during running, where the executable instructions cause the CPU 1001 to execute steps included in the foregoing object segmentation method. An Input/Output (I/O) interface 1005 is also connected to the bus 1004. The communication part 1012 may be configured integrally, and may also be configured to have multiple sub-modules (for example, multiple IB network interface cards) separately connected to the bus.

The following components are connected to the I/O interface 1005: an input section 1006 including a keyboard, a mouse and the like; an output section 1007 including a Cathode-Ray Tube (CRT), a Liquid Crystal Display (LCD), a speaker and the like; the storage section 1008 including a hard disk drive and the like; and a communication section 1009 of a network interface card including an LAN card, a modem and the like. The communication section 1009 performs communication processing via a network such as the Internet. A drive 1010 is also connected to the I/O interface 1005 according to requirements. A removable medium 1011 such as a magnetic disk, an optical disk, a magneto-optical disk, a semiconductor memory is installed on the drive 1010 according to requirements, so that a computer program read from the removable medium is installed on the storage section 1008 according to requirements.

It should be particularly noted that, the architecture illustrated in FIG. 10 is merely an optional implementation. During an optional practice process, the number and types of the components in FIG. 10 may be selected, decreased, increased, or replaced according to actual requirements. Different functional components may be configured separately or integrally or the like. For example, the GPU and the CPU may be configured separately. For another example, the GPU may be integrated on the CPU, and the communication part may be configured separately, and may also be configured integrally on the CPU or the GPU or the like. These alternative implementations all fall within the scope of protection of the present disclosure.

Particularly, a process described above with reference to a flowchart according to the embodiments of the present disclosure may be implemented as a computer software program. For example, the embodiments of present disclosure include a computer program product. The computer program product includes a computer program tangibly included in a machine-readable medium. The computer program includes a program code for performing steps shown in the flowchart. The program code may include instructions for correspondingly performing steps of the method provided in the present disclosure.

In such implementations, the computer program is downloaded and installed from the network through the communication section 1009, and/or is installed from the removable medium 1011. When the computer program is executed by the CPU 1001, the instructions implementing the corresponding steps recited in the present disclosure are executed.

In one or more optional implementations, the embodiments of the present disclosure further provide a computer program product configured to store computer-readable instructions, where when the instructions are executed, a computer executes the vehicle lamp detection method, the method for training a neural network, or the method for implementing intelligent driving in any of the embodiments.

The computer program product is implemented by means of hardware, software, or a combination thereof. In an optional example, the computer program product is represented by a computer storage medium. In another example, the computer program product is represented by a software product, such as Software Development Kit (SDK).

In one or more optional embodiments, the embodiments of the present disclosure further provide another vehicle lamp detection method, a method for training a neural network, a corresponding apparatus, an electronic device, a computer storage medium, a computer program, and a computer program product. The method includes: a first apparatus sends to a second apparatus a vehicle lamp detection indication, or a neural network training indication, or an intelligent driving indication; the indication enables the second apparatus to execute any possible vehicle lamp detection method or method for training a neural network or method for implementing intelligent driving; the first apparatus receives the vehicle lamp detection result or the neural networking training result or the driving control information or drive early warning prompt information for implementing intelligent driving sent by the second apparatus.

In some embodiments, a vehicle lamp detection indication or neural network training indication may be an invocation instruction. The first apparatus instructs, by means of invocation, the second apparatus to perform a vehicle lamp detection operation, a neural network training operation, or an intelligent driving operation; accordingly, in response to reception of the invocation instruction, the second apparatus may perform steps and/or procedures in any embodiment of the foregoing vehicle lamp detection method, method for training a neural network, or method for implementing intelligent driving.

It should be understood that the terms such as "first" and "second" in the embodiments of the present invention are only used for distinguishing, and shall not be understood as limitations on the embodiments of the present invention. It should also be understood that, in the present invention, "multiple" may refer to two or more, and "at least one" may refer to one, two or more. It should also be understood that, for any component, data or structure mentioned in the present disclosure, if there is no explicit limitation or no opposite motivation is provided in context, it is generally understood that the number of the component, data or structure is one or more. It should also be understood that, the descriptions of the embodiments in the present disclosure focus on differences between the embodiments, and for same or similar parts in the embodiments, refer to these embodiments. For the purpose of brevity, details are not described again.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. The foregoing specific sequence of steps of the method is merely for description, and unless otherwise stated particularly, is not intended to limit the steps of the method in the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to persons of ordinary skill in the art. The embodiments are selected and described to better describe a principle and an actual application of the present disclosure, and to make persons of ordinary skill in the art understand the present disclosure, so as to design various embodiments with various modifications applicable to particular use.

The invention claimed is:

1. A vehicle lamp detection method, comprising:
  obtaining an image block comprising an image of a vehicle;
  performing vehicle lamp detection on the image block with a deep neural network, to obtain a vehicle lamp detection result,
  wherein the vehicle lamp detection result comprises vehicle lamp external frame information, a vehicle lamp on-and-off state and a vehicle lamp orientation, wherein the vehicle lamp external frame information is information capable of showing a position of a vehicle lamp external frame in the image blocks;
  performing vehicle lamp external frame leak detection on multiple image blocks having a timing sequence relation according to the vehicle lamp detection results, to obtain corrected vehicle lamp external frame information in the multiple image blocks, which comprises:
  obtaining a vehicle lamp identifier corresponding to at least one vehicle lamp external frame according to the multiple image blocks having the timing sequence relation and the vehicle lamp external frame information in the multiple image blocks,
  for a vehicle lamp identifier, predicting a position of a vehicle lamp external frame having the vehicle lamp identifier in an m1-th image block according to positions of vehicle lamp external frames having the vehicle lamp identifier in n1 image blocks in front of the m1-th image block, and
  adding the vehicle lamp external frame to the m1-th image block according to the predicted position of the vehicle lamp external frame under the condition that no vehicle lamp external frame having the vehicle lamp identifier exists in the m1-th image block: and determining vehicle lamp indication information according to the vehicle lamp detection results of the multiple image blocks having a timing sequence relation.

2. The method according to claim 1, further comprising:
generating drive control information or drive early warning prompt information according to the vehicle lamp indication information.

3. The method according to claim 1, wherein before the determining the vehicle lamp indication information according to the vehicle lamp detection results of the multiple image blocks having the timing sequence relation, the method further comprises:
performing vehicle lamp external frame smoothing processing on the multiple image blocks having the timing sequence relation according to the vehicle lamp detection results, to obtain corrected vehicle lamp external frame information in the multiple image blocks.

4. The method according to claim 3, wherein the performing the vehicle lamp external frame leak detection and the vehicle lamp external frame smoothing processing on the multiple image blocks having the timing sequence relation according to the vehicle lamp detection results comprises:
performing the vehicle lamp external frame leak detection and the vehicle lamp external frame smoothing processing on at least one of the multiple image blocks according to the vehicle lamp identifier corresponding to the at least one vehicle lamp external frame.

5. The method according to claim 4, wherein the performing the vehicle lamp external frame leak detection and the vehicle lamp external frame smoothing processing on at least one of the multiple image blocks according to the vehicle lamp identifier corresponding to the at least one vehicle lamp external frame comprises:
performing vehicle lamp external frame position correction processing on the m1-th image block based on the predicted position of the vehicle lamp external frame.

6. The method according to claim 5, wherein the performing vehicle lamp external frame position correction processing on the m1-th image block based on the predicted position of the vehicle lamp external frame comprises:
performing weighted average processing on the predicted position of the vehicle lamp external frame and the position of the vehicle lamp external frame having the vehicle lamp identifier in the m1-th image block under the condition that the vehicle lamp external frame having the vehicle lamp identifier exists in the m1-th image block.

7. The method according to claim 1, wherein the determining the vehicle lamp indication information according to the vehicle lamp detection results of the multiple image blocks having the timing sequence relation comprises:
collecting statistics about vehicle lamp on-and-off states for multiple vehicle lamp external frames having a timing sequence relation corresponding to a same vehicle lamp of a same vehicle and determining the vehicle indication information according to a statistical result.

8. The method according to claim 1, wherein
the image block is an image to be processed; or
the image block is a partial image comprising an image of a vehicle in the image to be processed; or
the image block is an image block obtained by processing the partial image comprising the image of the vehicle in the image to be processed.

9. The method according to claim 8, wherein the obtaining the image block comprising the image of the vehicle comprises:

performing vehicle detection on the image to be processed; and
segmenting the image to be processed according to the vehicle detection result, to obtain the image block comprising the image of the vehicle.

10. The method according to claim 9, wherein the performing vehicle detection on the image to be processed comprises:
performing the vehicle detection on the image to be processed using a vehicle detection model, to obtain vehicle external frame information in the image to be processed.

11. The method according to claim 10, wherein the performing vehicle detection on the image to be processed further comprises:
performing at least one of vehicle external frame leak detection or vehicle external frame smoothing processing on the multiple images to be processed having a timing sequence relation, to obtain corrected vehicle external frame information in the multiple images to be processed.

12. The method according to claim 11, wherein the performing at least one of the vehicle external frame leak detection or the smoothing processing on the multiple images to be processed having the timing sequence relation comprises:
obtaining a vehicle identifier corresponding to at least one vehicle external frame according to the multiple images to be processed having the timing sequence relation and the vehicle external frame information thereof; and
performing at least one of the vehicle external frame leak detection or the vehicle external frame smoothing processing on at least one of the multiple images to be processed according to the vehicle identifier corresponding to the at least one vehicle external frame.

13. The method according to claim 12, wherein the performing at least one of the vehicle external frame leak detection or the vehicle external frame smoothing processing on the at least one of the multiple images to be processed according to the vehicle identifier corresponding to the at least one vehicle external frame comprises:
for a vehicle identifier, predicting a position of a vehicle external frame having the vehicle identifier in an m2-th image to be processed according to positions of vehicle external frames having the vehicle identifier in n2 images to be processed in front of the m2-th image to be processed; and
performing vehicle external frame addition or vehicle external frame position correction processing on the m2-th image to be processed based on the predicted position of the vehicle external frame.

14. The method according to claim 13, wherein the performing vehicle external frame addition or vehicle external frame position correction processing on the m2-th image to be processed based on the predicted position of the vehicle external frame comprises:
adding the vehicle external frame to the m2-th image to be processed according to the predicted position of the vehicle external frame under the condition that no vehicle external frame having the vehicle identifier exists in the m2-th image to be processed; or
performing weighted average processing on the predicted position of the vehicle external frame and the position of the vehicle external frame having the vehicle identifier in the m2-th image to be processed under the condition that the vehicle external frame having the vehicle identifier exists in the m2-th image to be processed.

15. The method according to claim 1, wherein the deep neural network is obtained by training using a sample image block having vehicle lamp annotation information; and
wherein the process of training the deep neural network comprises:
obtaining a sample image block comprising an image of a vehicle;
performing vehicle lamp detection on the sample image block by means of a deep neural network to be trained, to obtain a vehicle lamp detection result; and
using a difference between the vehicle lamp detection result and the vehicle lamp annotation information of the sample image block as guidance information to perform supervised learning on the deep neural network to be trained.

16. The method according to claim 15, wherein the vehicle lamp annotation information comprises at least one of: vehicle lamp external frame information annotation information, vehicle lamp on-and-off state annotation information, or vehicle lamp orientation annotation information.

17. A vehicle lamp detection apparatus, comprising:
a memory storing processor-executable instructions; and
a processor arranged to execute the stored processor-executable instructions to perform steps of:
obtaining an image block comprising an image of a vehicle;
performing vehicle lamp detection on the image block with a deep neural network, to obtain a vehicle lamp detection result,
wherein the vehicle lamp detection result comprises vehicle lamp external frame information, a vehicle lamp on-and-off state and a vehicle lamp orientation, wherein the vehicle lamp external frame information is information capable of showing a position of a vehicle lamp external frame in the image blocks;
performing vehicle lamp external frame leak detection on multiple image blocks having a timing sequence relation according to the vehicle lamp detection results, to obtain corrected vehicle lamp external frame information in the multiple image blocks, which comprises:
obtaining a vehicle lamp identifier corresponding to at least one vehicle lamp external frame according to the multiple image blocks having the timing sequence relation and the vehicle lamp external frame information in the multiple image blocks,
for a vehicle lamp identifier, predicting a position of a vehicle lamp external frame having the vehicle lamp identifier in an m1-th image block according to positions of vehicle lamp external frames having the vehicle lamp identifier in n1 image blocks in front of the m1-th image block, and
adding the vehicle lamp external frame to the m1-th image block according to the predicted position of the vehicle lamp external frame under the condition that no vehicle lamp external frame having the vehicle lamp identifier exists in the m1-th image block: and
determining vehicle lamp indication information according to the vehicle lamp detection results of the multiple image blocks having a timing sequence relation.

18. A non-transitory computer-readable storage medium having stored thereon computer-readable instructions that, when executed by a processor, cause the processor to execute a vehicle lamp detection method, the method comprising:
obtaining an image block comprising an image of a vehicle;
performing vehicle lamp detection on the image block with a deep neural network, to obtain a vehicle lamp detection result,
wherein the vehicle lamp detection result comprises vehicle lamp external frame information, a vehicle lamp on-and-off state and a vehicle lamp orientation, wherein the vehicle lamp external frame information is information capable of showing a position of a vehicle lamp external frame in the image blocks;
performing vehicle lamp external frame leak detection on multiple image blocks having a timing sequence relation according to the vehicle lamp detection results, to obtain corrected vehicle lamp external frame information in the multiple image blocks, which comprises:
obtaining a vehicle lamp identifier corresponding to at least one vehicle lamp external frame according to the multiple image blocks having the timing sequence relation and the vehicle lamp external frame information in the multiple image blocks,
for a vehicle lamp identifier, predicting a position of a vehicle lamp external frame having the vehicle lamp identifier in an m1-th image block according to positions of vehicle lamp external frames having the vehicle lamp identifier in n1 image blocks in front of the m1-th image block, and
adding the vehicle lamp external frame to the m1-th image block according to the predicted position of the vehicle lamp external frame under the condition that no vehicle lamp external frame having the vehicle lamp identifier exists in the m1-th image block: and
determining vehicle lamp indication information according to the vehicle lamp detection results of the multiple image blocks having a timing sequence relation.

* * * * *